(12) United States Patent
Taylor et al.

(10) Patent No.: US 7,650,265 B2
(45) Date of Patent: Jan. 19, 2010

(54) METHODS OF USING GEOMETRIC CONSTRUCTS FOR NEUTRONICS MODELING

(75) Inventors: John Taylor, Hampstead, NC (US); William Peters, Wilmington, NC (US); Lon Paulson, Wilmington, NC (US)

(73) Assignee: Global Nuclear Fuel - Americas, LLC, Wilmington, NC (US)

( * ) Notice: Subject to any disclaimer, the term of this patent is extended or adjusted under 35 U.S.C. 154(b) by 516 days.

(21) Appl. No.: 10/679,427

(22) Filed: Oct. 7, 2003

(65) Prior Publication Data

US 2005/0075848 A1  Apr. 7, 2005

(51) Int. Cl.
*G06G 7/48* (2006.01)
*G06F 7/60* (2006.01)
*G09B 23/26* (2006.01)
*G21H 1/06* (2006.01)

(52) U.S. Cl. .............................. 703/6; 703/2; 434/278; 376/159

(58) Field of Classification Search ..................... 703/2, 703/12, 6; 376/110, 463, 159; 434/278
See application file for complete search history.

(56) References Cited

U.S. PATENT DOCUMENTS

| | | | | |
|---|---|---|---|---|
| 3,663,346 | A * | 5/1972 | Schoen | 428/116 |
| H000744 | H * | 2/1990 | Iverson | 252/478 |
| 5,793,373 | A * | 8/1998 | Sekine et al. | 345/420 |
| 5,936,628 | A * | 8/1999 | Kitamura et al. | 345/420 |
| 6,718,291 | B1 * | 4/2004 | Shapiro et al. | 703/2 |
| 7,110,888 | B1 * | 9/2006 | Nicholls | 702/27 |
| 7,233,888 | B2 * | 6/2007 | Chiang et al. | 703/6 |
| 2001/0056308 | A1 * | 12/2001 | Petrov et al. | 700/98 |
| 2003/0012324 | A1 * | 1/2003 | Haruyama | 376/159 |
| 2004/0022342 | A1 * | 2/2004 | Magill et al. | 376/156 |
| 2005/0018885 | A1 * | 1/2005 | Chen et al. | 382/128 |

FOREIGN PATENT DOCUMENTS

| | | |
|---|---|---|
| JP | 05-40809 | 2/1993 |
| JP | 06-35996 | 2/1994 |
| JP | 06-44346 | 2/1994 |
| JP | 06-44363 | 2/1994 |
| JP | 2936088 | 6/1999 |
| JP | 2936089 | 6/1999 |
| JP | 2967030 | 8/1999 |

(Continued)

OTHER PUBLICATIONS

Solid Edge, 2000, Unigraphics Solutions Inc, pp. iii-vi, 29-163, 421-439.*

(Continued)

*Primary Examiner*—Paul L Rodriguez
*Assistant Examiner*—Eunhee Kim
(74) *Attorney, Agent, or Firm*—Harness, Dickey & Pierce, PLC

(57) ABSTRACT

Various geometric constructs are configured for use in modeling a system, for example a fissile system, using an analysis method, such as Monte Carlo, to model such systems based upon the interstitial regions formed by these geometric constructs. The various geometric constructs are configured to provide for modeling of, for example, complex arrays and lattices and allows for embedding of these constructs and virtual filling of arrays of these modeled units.

21 Claims, 14 Drawing Sheets

FOREIGN PATENT DOCUMENTS

| | | |
|---|---|---|
| JP | 2980820 | 9/1999 |
| JP | 2003-090883 | 3/2003 |
| JP | 2004-53599 | 2/2004 |

OTHER PUBLICATIONS

Solid Edge, 2000, Unigraphics Solutions Inc, pp. 2, 195-229, 252, 260-263.*

Criticality Analysis of Heterogeneous Light Water Reactor Configurations, Nuclear Science and Engineering: 113, 239-250; Mar. 1993; S. Sitaraman and F. Rahnema.*

Clark, Hugh K., *Critical and Safe Masses and Dimensions of Lattices of U and $UO_2$ Rods in Water*, Stockholm, Sweden: Symposium on Criticality Control of Fissile Materials, Feb. 1966, pp. 1-60.

* cited by examiner

INTERS GEOMETRY CONSTRUCT

INTERS GEOMETRY CONSTRUCT

SPINTERS GEOMETRY CONSTRUCT

TRITERS GEOMETRY CONSTRUCT

COMPLEX EMBEDDED OPTION

VIRTUAL FILL OPTION

EMBEDDED SQUARE LATTICE WITH OVERLAP

EMBEDDED SQUARE LATTICE W/O OVERLAP

EMBEDDED SQUARE LATTICE USING VFO

EMBEDDED TRIANGULAR LATTICE WITH OVERLAP

EMBEDDED TRIANGULAR LATTICE W/O OVERLAP

EMBEDDED TRIANGULAR LATTICE USING VFO

CREATING A FUEL ROD WITH THE INTERS CONSTRUCT

FUEL CYLINDER IN A TRIANGULAR PITCH ARRAY IS FORMED BY FOUR CORNERS.

FIG. 15A
INTERS GEOMETRY CONSTRUCT
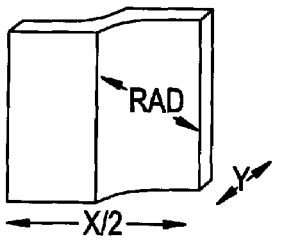
MISSING EDGES +1 ORIENTATION
FIG. 15B
INTERS GEOMETRY CONSTRUCT
MISSING EDGES -1 ORIENTATION
FIG. 15C
VIRTUAL FILL OPTION (SIMPLIFIED FLOW DIAGRAM)
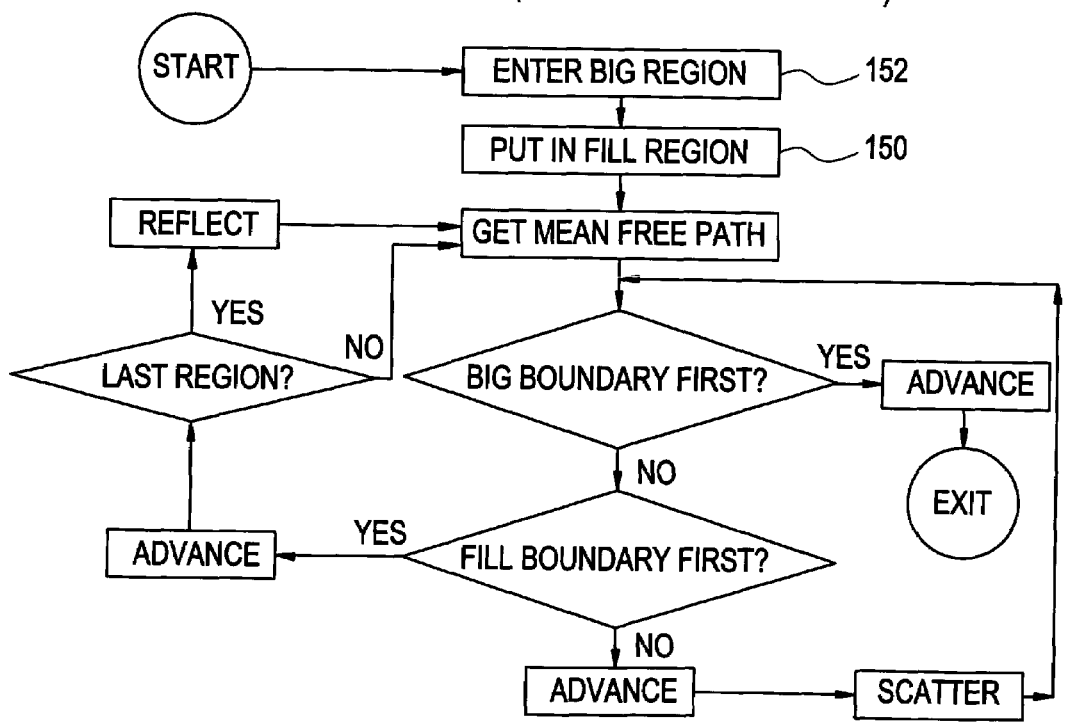

METHODS OF USING GEOMETRIC CONSTRUCTS FOR NEUTRONICS MODELING

BACKGROUND OF THE INVENTION

1. Field of the Invention

This invention relates to modeling fissile systems for providing nuclear criticality analyses.

2. Description of Related Art

Nuclear criticality analyses such as criticality analyses of shipping containers, process equipment, and facility process equipment interactions, for example, are used to ensure acceptable safety levels in, for example, nuclear fuel processing facilities. In particular, geometric modeling may be provided in connection with Monte Carlo methods for evaluating the various interactions within a fissile system. Geometric modeling for use with Monte Carlo methods has become a primary analytical tool in nuclear criticality safety analyses, with the use of such geometric modeling extended more frequently to complex structures and arrays. Further, increased regulatory requirements, especially in analyses of shipping containers and equipment, process or facility interactions has increased the need for using such geometric modeling in connection with Monte Carlo methods for providing criticality analyses. Further, this analyses often requires complex modeling of areas of fissile systems with little or no geometric symmetry.

With respect to a criticality analyses of fissile systems, geometric modeling may be used to estimate the effective neutron multiplication factor (k-effective, or $k_{eff}$), which represents the degree to which the neutron population is either increasing or decreasing, thus indicating whether the defined fissile system being modeled approaches or exceeds a sustained nuclear chain reaction. A system that exceeds a sustained nuclear chain reaction is said to be "supercritical" and is identified by a k-effective >1.0. A system that just reaches a sustained nuclear chain reaction is said to be "critical" and is identified by a k-effective that is exactly equal to 1.00. Likewise, in nuclear criticality safety analyses, it is typical to demonstrate the system k-effective is <1.0 (e.g., "subcritical") with an adequate safety margin such that even under accident conditions the system remains subcritical. By using Monte Carlo methods to track neutrons through a model of a fissile system to estimate k-effective, a determination may be made as to whether the modeled fissile system is, for example, critical, supercritical or subcritical.

Analytic approaches to modeling fissile systems using Monte Carlo methods are limited in their ability to model the precise geometries involved. In particular, these analytic methods are limited in their ability to model complex geometries (e.g., triangular lattices of rods and spheres), as well as in their ability to combine the various geometries (e.g., combine overlapping lattices). It is important to model certain complex geometrical units such as triangular lattices of rods or spheres because these complex geometrical units often represent the most reactive worst-case conditions in criticality safety analyses. Further, the size of rods and spheres may become very small under optimum conditions, requiring the modeling of large numbers of rods or spheres. Thus, the complexity and difficulty of the modeling increases rapidly when small-dimensioned geometric shapes are required to entirely fill a much larger region.

Further, when modeling systems having complex geometric shapes, simple geometric shapes are used to create these complex geometries, which can reduce the accuracy of the modeling. Also, because of the limited capabilities of current analytic approaches to modeling, for example, embedded geometries such as lattices inside (e.g., contained within) other geometrical units require large amounts of run-time memory. Further, to efficiently perform calculations wherein very large numbers (e.g., millions) of individual geometrical units are required to fill a region, large amounts of run-time memory also can be required. As a result, extra processor power is needed to perform the complex calculations, for example, to search each geometrical unit in a lattice to determine where interactions or boundary crossings occur. Further, with respect to criticality analyses of heterogeneous lattices in, for example, shipping containers and facility interactions using known modeling systems, the cost for such analyses often exceeds reasonable limits as a result of the amount of computer time and/or the amount of processing power required to perform the calculations.

SUMMARY OF THE INVENTION

In an exemplary embodiment of the present invention, various geometric constructs are configured for use in modeling a system, for example a fissile system, using an analysis method, such as Monte Carlo, to model such systems based upon the interstitial regions formed by these geometric constructs. The various geometric constructs are configured to provide for modeling of, for example, complex arrays and lattices and allows for embedding of these constructs and virtual filling of arrays of these modeled constructs.

BRIEF DESCRIPTION OF THE DRAWINGS

The present invention will become more fully understood from the detailed description and the accompanying drawings, wherein:

FIG. 15A is a perspective view of a geometric construct of FIG. 2A having +1 missing edge.

FIG. 15B is a perspective view of a geometric construct of FIG. 2A having −1 missing edge.

FIG. 15C is a simplified flow diagram of the virtual fill option.

DETAILED DESCRIPTION OF THE EXEMPLARY EMBODIMENTS

The following description and exemplary embodiments thereof are merely exemplary in nature and is in no way intended to limit the invention, its application, or uses. Although, exemplary embodiments of the present invention are described in connection with a modeling system having particular geometric structures and geometric modeling methods and functionality for use in modeling fissile systems in order to perform a criticality analysis, they are not so limited, and variations and modifications to the geometric structures and geometric modeling methods and functionality may be provided to model different systems in order to perform different analyses.

Figure 1:
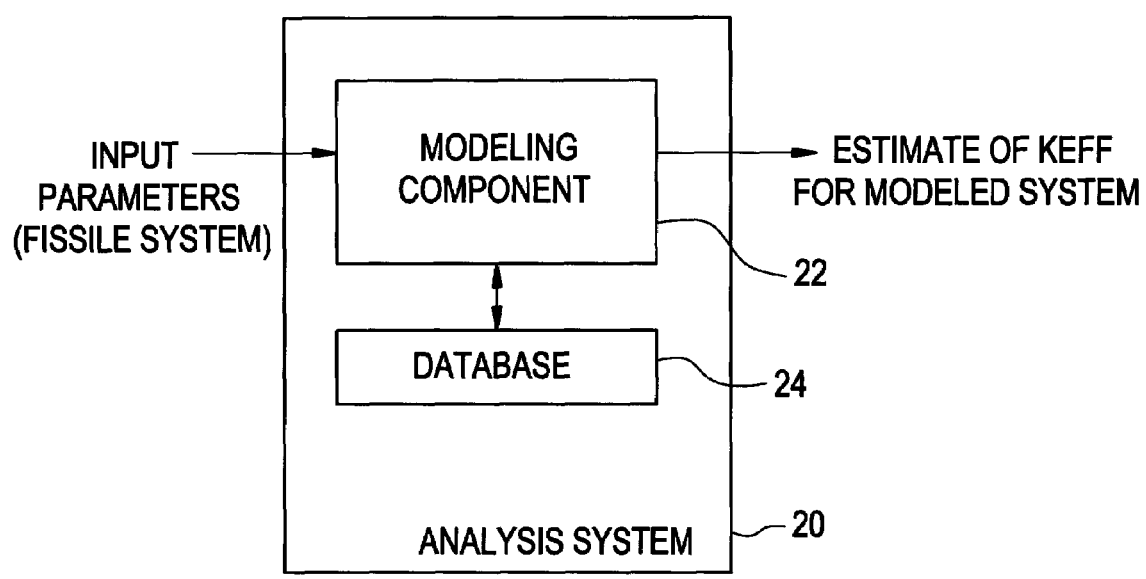
FIG. 1 is a block diagram of an analytic system in accordance with the exemplary embodiments of the present invention.

FIG. 1 is a block diagram of an analytic system in accordance with the exemplary embodiments of the present invention. FIG. 1 illustrates an exemplary analytic system 20, which may be configured, for example, as a Monte Carlo neutronics program that may be used to obtain a solution to a neutron transport equation by tracking neutrons through a computer model of a fissile system. Various exemplary embodiments of modeling structures (e.g., geometric constructs) and analytic methods of the present invention may be implemented in connection with the analytic system 20. Specifically, the analytic system 20 includes a modeling component 22 connected to a database 24. The modeling component 22 is configured to receive input parameters, for example, relating to a fissile system to be modeled for analyses, and process the input parameters (e.g., specifics regarding materials, such as composition, and dimensions of physical structures to be modeled) using information stored within the database 24 (e.g., properties for geometric units relating to the input parameters), and provide an output, such as a determination (e.g., estimate) of the neutron multiplication factor (k-effective) for the modeled fissile system. Thus, a criticality analyses of a modeled system (e.g., nuclear fuel process, equipment, or facility) may be provided to determine whether the system is acceptably subcritical (i.e., safe) under accident conditions such as loss of moderator or loss of coolant causality.

In operation, and with respect to providing a criticality analysis using the analytic method 20 for example, neutrons are tracked through a system modeled by the modeling component 22. For example, a starting point for each neutron in a batch is selected. The mean free path (A) is then obtained for a neutron based on event probabilities in, for example, a cross-section library for the material it is passing through, which information may be stored within the database 24. The analytic system 20 then advances the neutron using a known process (e.g., using a Monte Carlo program such as GEKENO or GEMER) to the collision point in the material, or advances the neutron to the closest boundary that exists along a path ahead of the collision point. The contribution to fission is the product of the path length times the macroscopic cross-section for fission times the neutron weight. The neutron weight is a fraction that allows some of the neutron to be absorbed and the remainder to continue to be tracked by a tracking process.

Further, the contribution to absorption is the product of the path length times the macroscopic cross-section for absorption times the neutron weight. The neutron weight (e.g., the fraction that allows some of the neutron to be absorbed and the remainder to continue to be tracked by the tracking process) is then reduced by the probability of absorption. If the weight drops below a minimum value, then the neutron is randomly either (a) doubled in weight; or (b) removed entirely from the system being modeled (e.g., Russian Roulette). If the neutron is advanced to a new position in the material, a new set of tracking information (e.g., direction cosines and mean free path) are determined and the tracking process repeats. If the neutron is advanced to a boundary, a new mean free path and event probabilities are obtained for the new material and the tracking process repeats.

When a collision point occurs in fissile material, the position is entered into a starting source array for the next batch (e.g., next batch of neutron collision trackings) with the current weight. This position entering process is repeated until the neutron is removed from the system (e.g., neutron is eliminated or leaks from the modeled system). The process is then repeated for the rest of the neutrons in the batch. The next batch is then processed using the starting source array generated by the current batch. After all requested batches are processed, the Monte Carlo neutron transport calculations terminate. The modeling of the system thereby enables determination of the relative criticality safety (subcritical margin) of the system, and more particularly, a calculation of the estimate of k-effective, the effective neutron multiplication for the modeled system.

With respect to the modeling component 22, a region (e.g., box type) may be defined and may include one or more geometric regions therein, such that each region substantially or completely contains the preceding region within the same box type. Further, each region may be defined by a geometry type descriptor, a mixture number identifying the material within the region, a set of dimensions for the region and a set of region dependent weights. A plurality of selectable geometry types may be provided for use by the modeling component 22 in connection with the input parameters to model a fissile system, for example. The following exemplary geometric units or structures may be provided:

(1) A cuboid, which is modeled as a six sided figure with a pair of sides perpendicular to each of the orthogonal axes. The cuboid is modeled by providing the signed distance from the origin for each of the sides in a specified order (e.g., +X, −X, +Y, −Y, +Z, −Z), with the volume of the cuboid defined by the following equation:

$$\text{Volume} = \text{Delta } X * \text{Delta } Y * \text{Delta } Z$$

(2) A cube, which is defined similar to a cuboid, but with all dimensions equal and centered on the origin.

(3) A general unit, which is defined similar to a cuboid, but used to map a generalized geometry box type into a model. A generalized geometry box type may be created using quadratic surface equations rather than predetermined geometry constructs (e.g., cube, cuboid, cylinder, sphere, etc).

(4) A core body, which is defined similar to a cuboid, but used to define an outer boundary for a mixed box model (e.g., box having different geometries or mixtures).

(5) A sphere, which is modeled as centered on the origin (i.e., 0, 0, 0 coordinates in an XYZ system) and having a volume defined by the following equation:

$$\text{Volume} = 4/3 * \pi * R^3$$

when R is the radius of the sphere.

(6) A hemisphere, which is modeled as half of a sphere and defined to be on one side of a plane through the origin perpendicular to one axis (e.g., hemisphere (+X) is on the positive side of the plane through the origin perpendicular to the X axis).

(7) A cylinder, which is modeled as a finite, right cylinder centered on the Z axis between two planes perpendicular to the Z axis, with a volume defined by the following equation:

$$\text{Volume} = \pi * R^2 * \text{Delta Height},$$

when R is the radius of the cylinder and the Delta Height is the height of the cylinder.

(8) A hemi-cylinder, which is modeled as half of a cylinder and defined to be on one side of a plane through the origin perpendicular to one axis (e.g., hemi-cylinder (+X) is on the positive side of the plane through the origin perpendicular to the X axis). It should be noted that the cylinder may be centered on different axes (e.g., X or Y axis).

(9) A cone, which is modeled as a conical shape centered on the Z axis between two planes perpendicular to the Z axis. It should be noted that the cone may be circular or elliptical (with a constant ratio of semi-major to semi-minor axes), and may have vertical sides. The volume of the cone is defined by the following equation:

$$\text{Volume} = \pi * H/6 * (X1*Y1 + (X1+X2)*(Y1+Y2) + X2*Y2)$$

where X1 and Y1 are semi-major and semi-minor axes at the top of cone, and X2 and Y2 are semi-major and semi-minor axes at the bottom of the cone.

(10) A pyramid, which is modeled as a six sided figure with two rectangular sides perpendicular to the Z axis. Either or both of these sides may be outside of the Z axis. The volume of the pyramid is defined by the following equation:

$$\text{Volume} = H/6 * (X1*Y1 + (X1+X2)*(Y1+Y2) + X2*Y2)$$

where H is the pyramid height, X1 and Y1 are the delta X and delta Y dimensions at the top of pyramid and X2 and Y2 are the delta X and delta Y dimensions at the bottom of the pyramid.

Other general basic geometric units or structures may be provided as desired or needed, for example, as a predetermined set of geometric constructs included as part of a known Monte Carlo neutron transport program. Further, and as described in more detail herein, these geometric structures generally allow for forming square (or triangular) pitches when modeling systems with lattice geometry configurations.

Having described generally an analytic system 20 with a modeling component 22, which may be used for Monte Carlo neutron transport evaluations of fissile systems for providing a criticality analysis, for example, various exemplary embodiments of modeling structures and methods of the present invention that may be provided in connection with the modeling component 22 as part of the analytic system 20 will now be described. The various embodiments, for example, may be incorporated into Monte Carlo neutron transport analytic methods for use separately or in conjunction with each other to model, for example, complex arrays, lattices and assemblies.

Figure 2A:
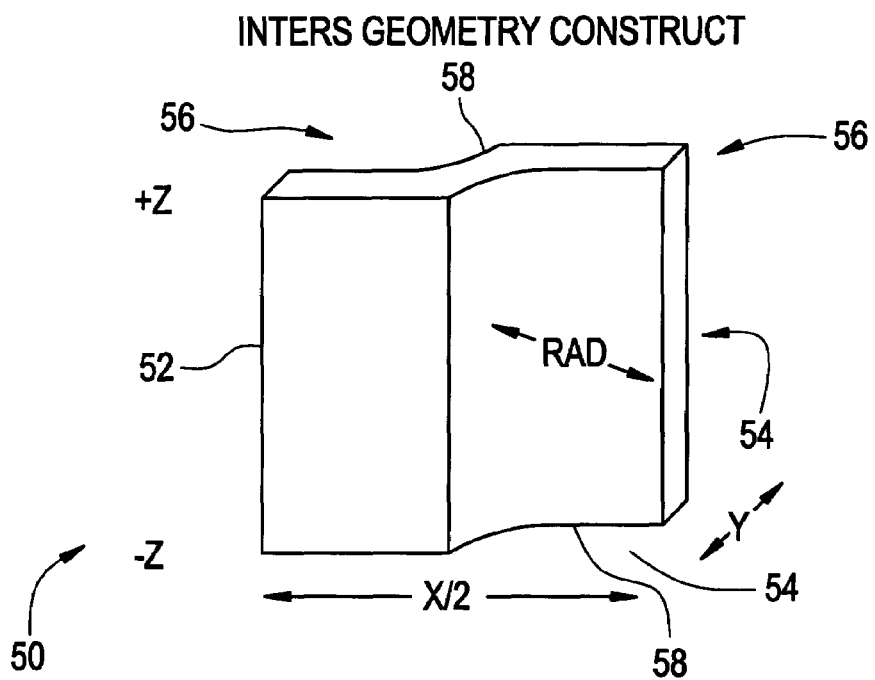
FIGS. 2A and 2B are side perspective views of an exemplary embodiment of the present invention.
Figure 2B:
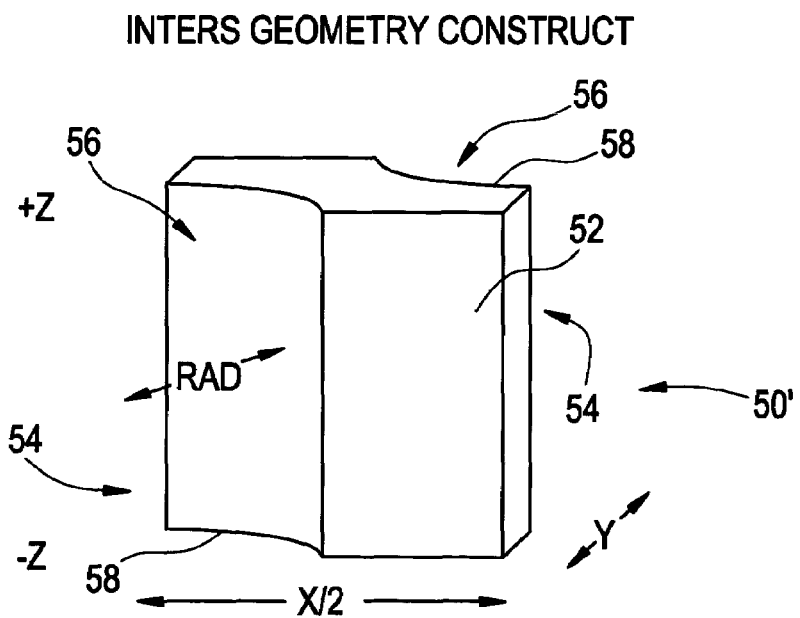
Figure 3:
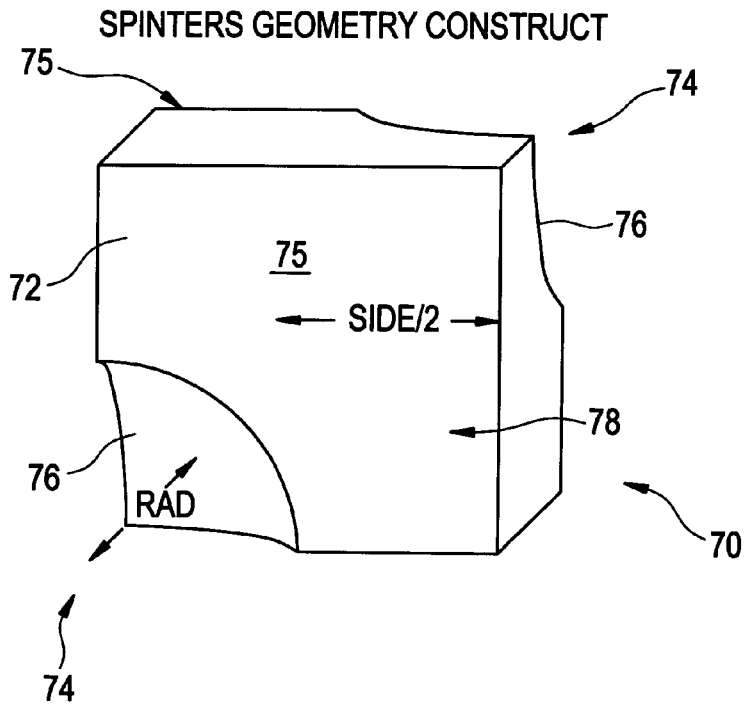
FIG. 3 is a side perspective view of another exemplary embodiment of a geometric construct of the present invention.
Figure 4:
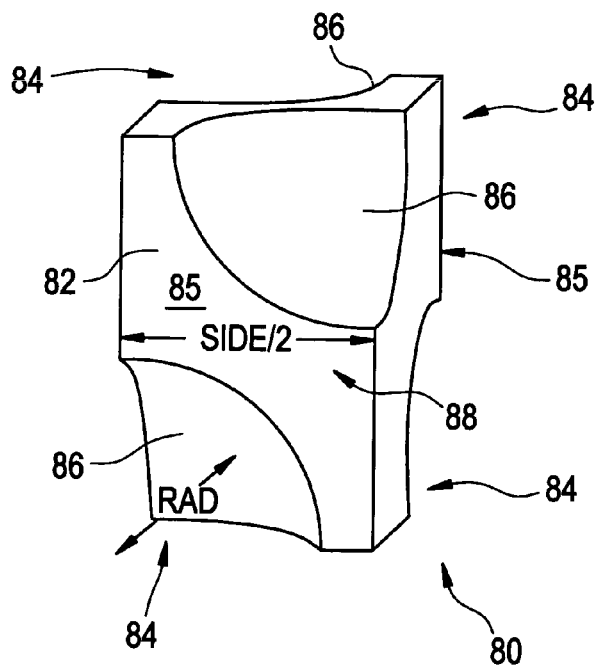
FIG. 4 is a side perspective view of another exemplary embodiment of a geometric construct of the present invention.

As shown in FIGS. 2 through 4, various geometric constructs may be provided for use in connection with the modeling component 22. Generally, as shown therein, these geometric constructs are configured to allow for modeling in simple rectangular boxes, parts of the unit components of triangular and body-centered cubic lattices, such that, for example, complete lattices may be constructed at the surfaces of the boxes using appropriate reflective boundary conditions. These geometric constructs are generally configured having curved concave portions (e.g., concave surfaces) for modeling of systems (e.g., fissile systems) using the modeling component 22 in FIG. 1. Interstitial regions formed by the curved concave portions when arranging (e.g., combining) the geometric constructs create the various elements or objects of a system being modeled and allow for forming the elements or objects in a triangular pitch.

Figure 5:
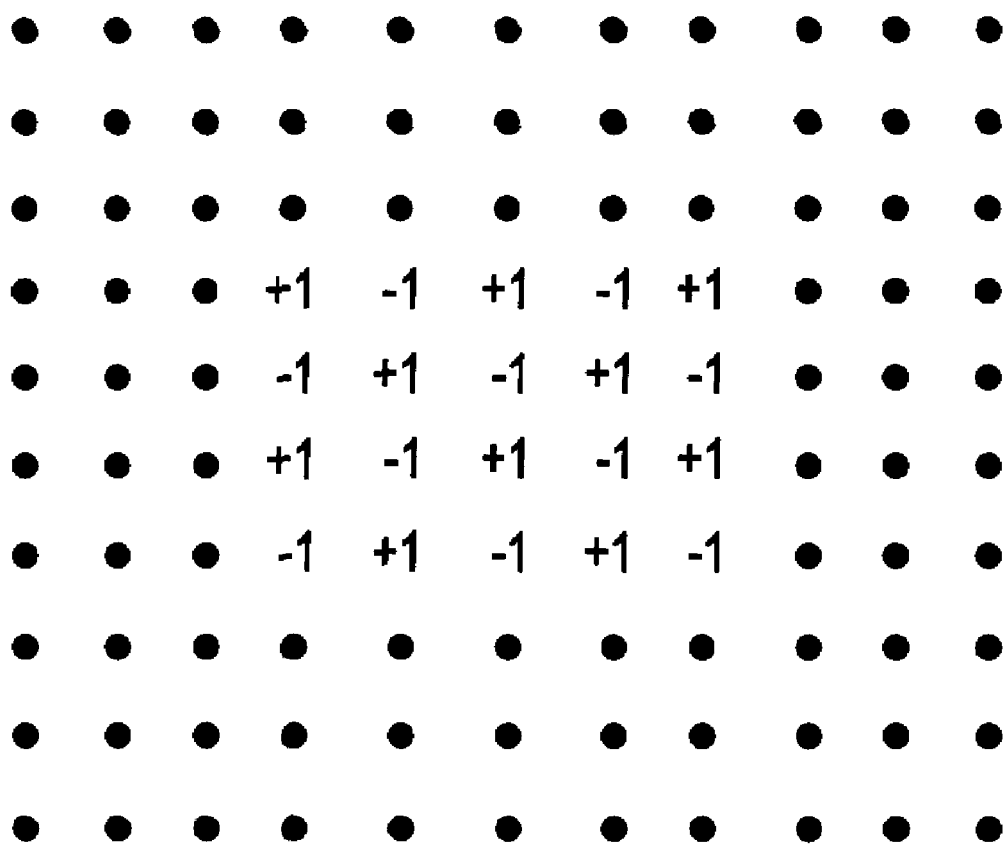
FIG. 5 is a schematic diagram illustrating the use of a geometric constructs using in an ordered array in accordance with an exemplary embodiment of the present invention.

FIGS. 2A and 2B are side perspective views of an exemplary embodiment of the present invention. As shown in FIGS. 2A and 2B, a first geometric unit 50 and 50' may provide a three-dimensional rectangular region 52 (e.g., rectangular body) that can be used for modeling a triangular lattice of cylindrical rods in a given matrix (e.g., water). As shown therein, exemplary embodiments of the first geometric unit 50 and 50' are configured such that the three-dimensional rectangular body 52 includes two opposite edges 54 and 56 that are modified in opposite corners 56 (e.g., corners removed), and more particularly, having a curved (e.g., concave) portion 58 configured equivalent to, for example, the shape of one-fourth of a cylinder (i.e., concave portion representing one-fourth of a cylinder shape removed from the opposite corners 54 and 56) formed thereon. Thus, when mirror reflected in the ±X and ±Y axes, the overall geometry is an infinite triangular lattice of, for example, fuel cylinders as described herein. It should be noted that an infinite triangular lattice of fuel cylinders in an alternating grid can also be created by stacking the first geometric units 50 and 50' (represented by +1 and -1) in both the X and Y directions as shown in FIG. 5.

In one exemplary embodiment, the parameters to control the configuration of the first geometric units 50 and 50' for use in modeling by the modeling component 22 may be specified as follows:

(1) Mix—specifies the material (e.g., mixture) inside the region represented by the first geometric units 50 and 50' (e.g., water);

(2) X—specifies the center-to-center pitch in the X-axis direction between the centerline of adjacent rods;

(3) Y—specifies the center-to-center pitch between adjacent rows of rods in the Y-axis direction (e.g., Y=0.5*Sqrt (3.0)*X);

(4) Radius—specifies the radius of the concave portions 58 (e.g., radius of the concave portion 58 having a shape of a portion of a surface of a cylinder);

(5) Sign—specifies the designator for which the opposite corners are missing; and (6) Z location (i.e., +Z and -Z)—specifies the axial locations of the top and bottom surfaces of the rectangular body 52, respectively.

Further, the curved portions 58 are defined as follows:

$$(X-X1)^2+(Y-Y1)^2-R^2=0$$

where R is the radius (RAD) shown in FIGS. 2A and 2B; X1 and Y1 are the edges prior to removal of the concave portions.

Using the above parameters and equation, cylindrical arrays for modeling formed by interstitial regions of the first geometric units 50 and 50' may be provided using, for example, the following input:

Mix No., X/4, Y/2, Radius, Sign, +Z, −Z

Figure 12:
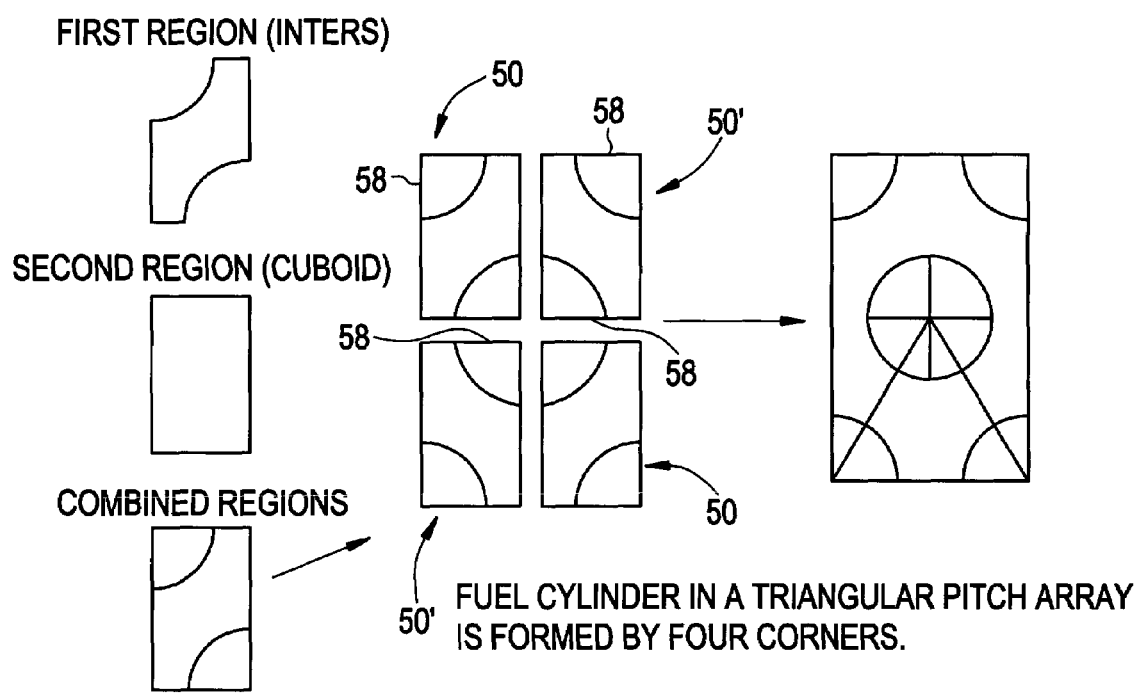
FIG. 12 is a block diagram showing cylindrical objects formed by the geometric constructs of FIGS. 2A and 2B arranged in a triangular orientation.
Figure 13:
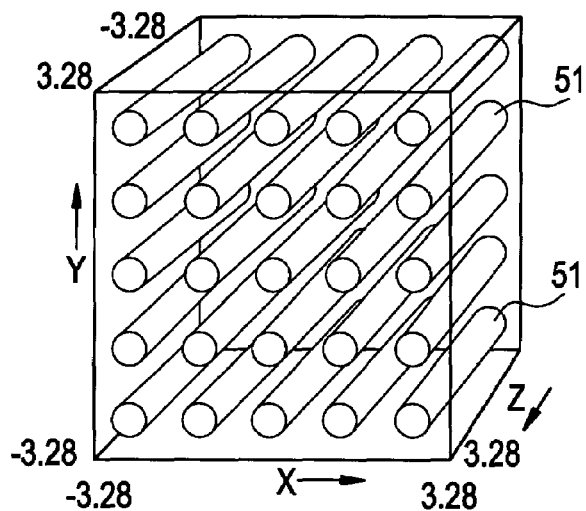
FIG. 13 is a perspective view of a square pitched array pitched array of cylinders constructed using an exemplary embodiment of the present invention.
Figure 14:
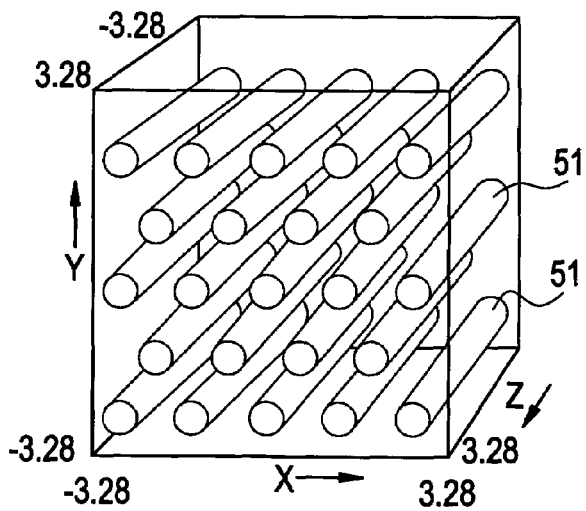
FIG. 14 is a perspective view showing a triangular pitched array of cylinders constructed using an exemplary embodiment of the present invention.

Using the first geometric units 50 and 50', and for example, a complete lattice unit cell may be modeled in a triangular orientation or pitch as shown in FIGS. 12-14. Referring to FIGS. 12-14, to model an entire lattice of rods 51, the first geometric units 50 and 50' may be used with reflective boundary conditions on all six sides, or with two separate box types specified alternately in the X and Y directions, one of which is the descriptor for the +1 missing edges and the other is the −1 missing edges. The first geometric units 50 and 50' having +1 and −1 missing edges are shown in FIGS. 15A and 15B. Further, and for example, for an equilateral triangular array of 100 centimeter (cm) tall, 1.27 cm in diameter fuel rods in water, with an X-Axis pitch of 2.00 cm between rods, the complete input description of the lattice unit cell is provided as follows (e.g., X/4=0.5 cm, Y/2=0.866 cm, R=0.635 cm):

(1) For the +1 Missing Edges:

| BOX TYPE | 1 /* INTERS with SIGN + 1.0 Matl 2 is H2O, Matl 1 is U(5.00)O2 | | | | | | |
|---|---|---|---|---|---|---|---|
| INTERS 16 * 0.5 | 2 | 0.500 | 0.866 | 0.635 | +1.0 | 50.00 | −50.00 |
| CUBOID 16 * 0.5 | 1 | 0.500 | −0.500 | 0.866 | −0.866 | 50.00 | −50.00 |

(2) For the −1 Missing Edges:

| BOX TYPE | 1 /* INTERS with SIGN + 1.0 Matl 2 is H2O, Matl 1 is U(5.00)O2 | | | | | | |
|---|---|---|---|---|---|---|---|
| INTERS 16 * 0.5 | 2 | 0.500 | 0.866 | 0.635 | −1.0 | 50.00 | −50.00 |
| CUBOID 16 * 0.5 | 1 | 0.500 | −0.500 | 0.866 | −0.866 | 50.00 | −50.00 |

Thus, the first geometric units 50 and 50' may be used for modeling cylinders formed by interstitial regions (i.e., created by the concave portions 58) between first geometric units 50 and 50' arranged as described herein.

FIG. 3 is a side perspective view of another exemplary embodiment of a geometric construct of the present invention. Referring now to FIG. 3, a second geometric unit 70 provides a three dimensional rectangular region (e.g., rectangular body) for modeling body-centered cubic lattices or arrays of spherical particles in a given matrix (e.g., water). As shown therein, an exemplary embodiment of the second geometric unit 70 includes a generally cubic body 72 with two opposite corners 74 having curved (e.g., concave) portions 76 on two oppositely facing surfaces 75 forming sides 78, configured, for example as the shape of one-eighth of a sphere (i.e., curved portion 76 representing one-eighth of a spherical shape removed from the opposite corners 74). Thus, when mirror reflected in the ±X, ±Y and ±Z axes, the overall geometry becomes an infinite body-centered cubic lattice. Because the cube has eight corners, four similar constructs can be created by removing two opposite corners. The body-centered cubic lattice also may be modeled by alternatively placing these four constructs at the appropriate locations in a close-packed three-dimensional array such that concave corners are always in contact with four other concave corners.

In an exemplary embodiment, the parameters to control the configuration of the second geometric unit 70 for use in modeling by the modeling component 22 may be specified as follows:

(1) Mix—specifies the material (e.g., mixture) inside the region represented by the second geometric unit 70 (e.g., water);

(2) Side—specifies the dimension of a side 78 of the generally cubic body 72; and (3) Radius—specifies the radius of the concave portions 76 (e.g., radius of the concave portion 76 having a shape of a portion of a surface of a spherical particle).

Further, the curved portions 76 may be defined as follows:

$$(X-X1)^2+(Y-Y1)^2+(Z-Z1)^2-R^2=0$$

where R is the radius (RAD) shown in FIG. 3, X1, Y1 and Z1 are the positions of the corner point.

Using the above parameters and equation, spherical arrays for modeling formed by the interstitial regions of the second geometric unit 70 may be provided using, for example, the following input:

Mix No., SIDE/2, Radius

The second geometric unit 70, thus, may be used for modeling configurations of spheres.

Figure 16:
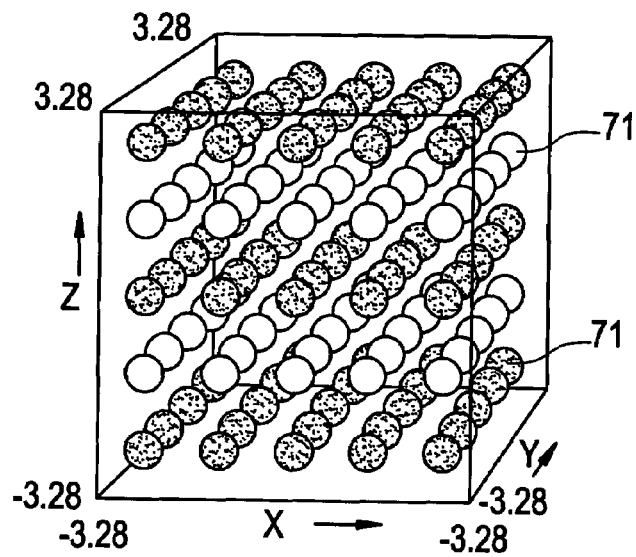
FIG. 16 is a perspective view of a simple cubic array of spheres for illustrative purposes.
Figure 17:
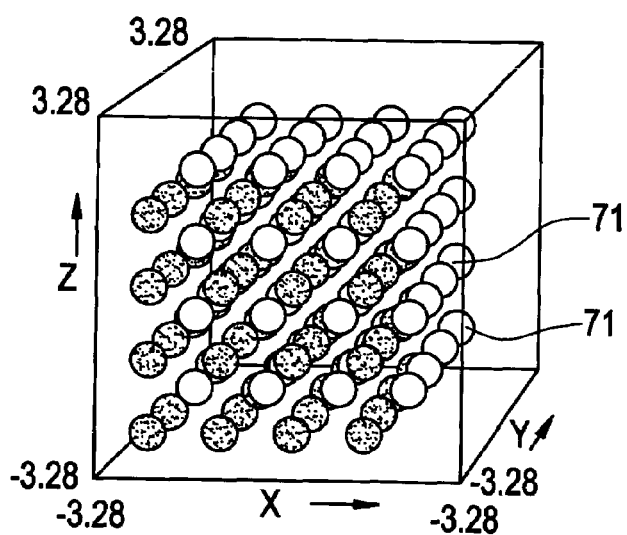
FIG. 17 is a perspective view of a body-centered cubic array of spheres resulting from using an exemplary embodiment of the present invention.

FIG. 16 is a perspective view of a simple cubic array of spheres for illustrative purposes. FIG. 17 is a perspective view of a body-centered cubic array of spheres resulting from using an exemplary embodiment of the present invention. If mirror reflection is applied to all six faces of a cube containing the second geometric unit 70, a body centered cubic (bcc) array of spheres 71 is obtained. A bcc array is defined by dividing a volume into a cubic grid and placing a sphere on each corner and in the center of each cube (i.e., a cube including nine spheres), thus forming a body centered cubic lattice as shown in FIGS. 16 and 17. In one exemplary embodiment, a cubic array is a simple cubic (sc) array, defined by dividing a volume into a cubic grid and placing a sphere on each corner of each cube (i.e., a cube consisting of eight spheres). In an (sc) array, along one axis, each successive plane is an identical square pitched plane of spheres 71 as shown in FIG. 16. In a bcc array, along one axis, each plane is a square pitched plane of spheres, but with each sphere halfway between any two closest spheres in the previous plane. Thus, each sphere in an sc array has six equidistant nearest neighbors and each sphere in a (bcc) array has eight equidistant nearest neighbors.

Figure 18:
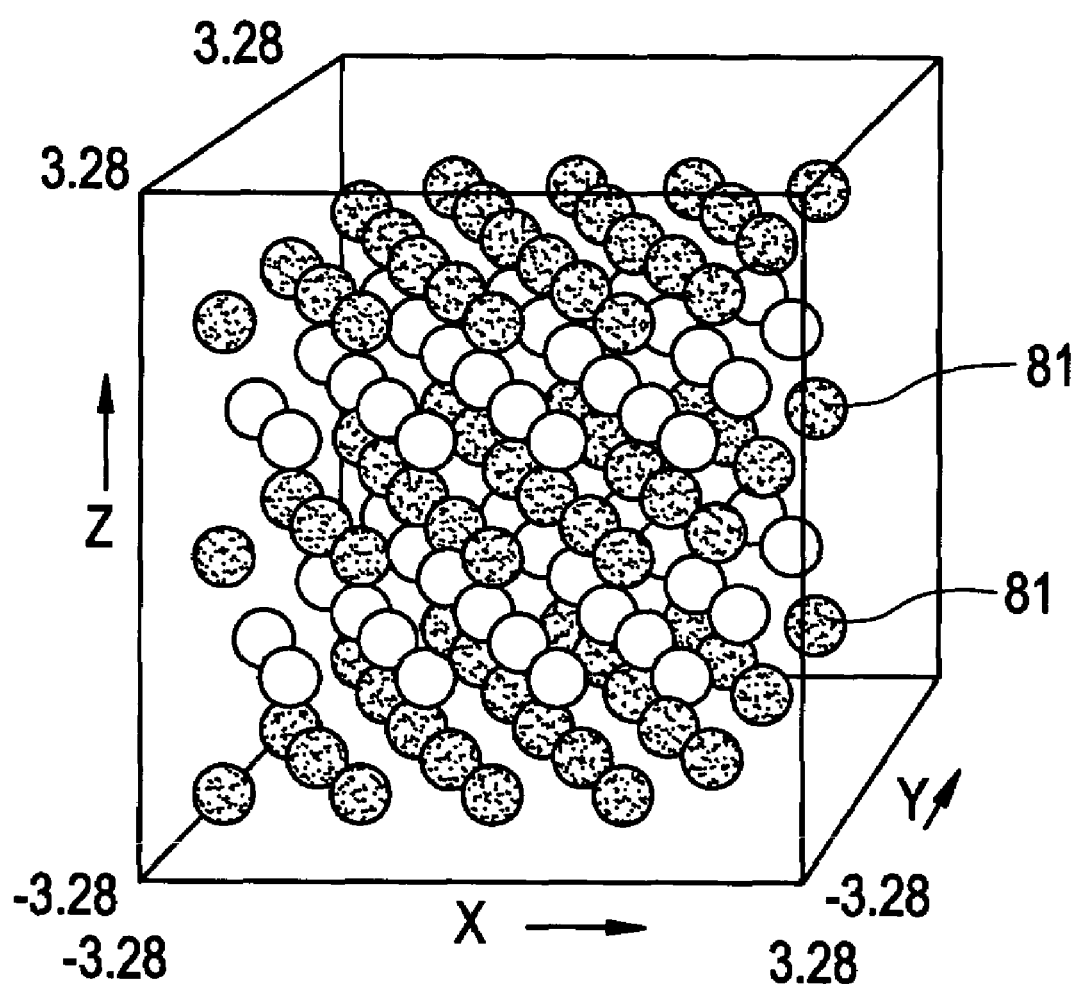
FIG. 18 is a perspective view of a triangular-pitched array of spheres resulting from using an exemplary embodiment of the present invention.

FIG. 4 is a side perspective view of another exemplary embodiment of a geometric construct of the present invention. FIG. 18 is a perspective view of a triangular-pitched array of spheres resulting from using an exemplary embodiment of the present invention. Referring now to FIG. 4, a third geometric unit 80 provides a three-dimensional rectangular region (e.g., rectangular body) for modeling triangular lattices of spherical particles 81 in a given matrix, for example water, using the third geometric construct as shown in FIG. 18. As shown in FIG. 4, the third geometric unit 80 includes a generally three-dimensional cubic body 82 with opposite corners 84 on each face having curved (e.g., concave) portions 86 on each of two oppositely facing surfaces 85 forming sides 88 of the cubic body 82. The curved portions 86 may be configured, for example, as one-eighth of a sphere at each of the corners 84.

The dimensions of the surfaces 85 of the third geometric unit 80 may be scaled such that when the third geometric unit 80 mirror is reflected in the ±X, ±Y and ±Z axes, the overall geometry is an infinite (fcc) triangular lattice. In this lattice, each plane contains a triangular pitch array of spheres with each sphere centered between two spheres in the adjacent planes. A (fcc) array is defined by dividing a volume into a cubic grid and placing a sphere on each corner and in the center of each side of the cube (a cube consisting of 14 spheres in all), thus forming a face centered cubic lattice (as shown in FIG. 18) and may effectively be used to create an infinite triangular pitch array of spheres 81. The associated input scaling factors may include the following:

| Side | Scaling Factor × Side Dimension |
|---|---|
| +X | SIDE/2 |
| −X | 0.00 |
| +Y | 0.866 × SIDE/2 |
| −Y | −0.866 × SIDE/2 |
| +Z | 0.866 × SIDE/2 |
| −Z | −0.866 × SIDE/2 |

[n.b. 0.866 = Sqrt(3.0)/2.0]

In an exemplary embodiment, the parameters to control the configuration of the third geometric unit 80 for use in modeling a cubical lattice by the modeling component 22 are specified as follows:

(1) Mix—specifies the material (e.g., mixture) inside the region represented by the second geometric unit 80 (e.g., water);

(2) Side—specifies the dimension of a side 88 of the generally cubic body 82; and (3) Radius—specifies the radius of the concave portions 86 (e.g., radius of the concave portion having a shape of a portion of a surface of a spherical particle).

Further, the curved portions 86 are defined as follows:

$$(X-X1)^2+(Y-Y1)^2+(Z-Z1)^2-R^2=0$$

where R is a radius of the concave portions of shape of a portion of a surface of a spherical particle. X1, Y1 and Z1 are the positions of the corner point.

Additionally, the volume of the third geometric unit 80 is defined as follows:

$$VOL=3*X(1)*X(1)*X(1)-0.6666667*\Pi*X(2)*X(2)*X(2) \quad (2)$$

Where X(1) is the first input geometry dimension (spacing/2) and X(2) is the second input geometry dimension (sphere radius).

The second subtracted term $(0.6666667*\Pi*X(2)*X(2)*X(2))$ represents the total volume removed from the four corners, which is half times 4 times ⅛ times the volume of the sphere of radius R.

Using the above parameters and equation, spherical particles for modeling formed by the interstitial regions of the third geometric unit 80 may be provided using, for example, the following input:

Mix No. SIDE/2 Radius

The third geometric unit 80 allows a triangular pitch array of spheres to be represented, for example, using virtual fill methods of the present invention as described in more detail herein. To obtain the triangular pitch, the X dimension is defined by 0.5*SPACING (e.g., spacing between centers of two spheres along the x-axis), and the Y and Z dimensions are COS 60°×SPACING. If mirror reflection is applied to all six faces of a cuboid containing the third geometric unit 80 inside of a cuboid, a triangular pitch (tri) array of spheres is obtained such that each X-Y layer is a triangular array of spheres with each layer shifted in the X direction 0.5*SPACING relative to the layer above and below. For example, FIG. 18 shows a three-dimensional perspective of a triangular-pitched array of spheres 81 resulting from this triangular pitched exemplary embodiment using the geometric construct of the present invention.

The third geometric unit 80 may be configured with the curved portions 86 provided at the −X, −Y, −Z corner 84, the −X, +Y, +Z corner 84, the +X, −Y, +Z corner 84 and the +X, +Y, −Z corner 84 to remove the ⅛ spheres at each of the four corners diagonally across the faces of the geometric construct illustrated by geometric unit 80.

Using the various exemplary embodiments of geometric units 50, 70, 80 of the present invention, a neutron intersection in Monte Carlo neutron tracking may be determined by substituting the neutron path for the values of X, Y, and Z where the path is:

$$X=X0+uD$$

$$Y=Y0+vD$$

$$Z=Z0+wD$$

Where X0, Y0 and Z0 are the starting neutron positions and u, v and w are the Monte Carlo generated direction cosines. D is the distance to the intersection as determined by Monte Carlo code from the macroscopic cross sections of the mixture in the tracking region. Direction cosines refer to the amount of a unit direction vector along orthogonal axis. If a positive value of D results, an intersection occurs.

In an exemplary embodiment, the modeling component 22 is configured to receive input files configured with the input parameters as described herein for use in modeling based upon the specified parameters. Further, the modeling component 22 may include tracking functionality as is known to determine whether a specific point (e.g. the location of a particle using Monte Carlo methods) is internal to or located at the boundary of the geometric units 50, 70 and 80. This provides for a determination of the distance to the nearest applicable boundary in the region. The boundaries are the X, Y or Z surfaces or the concave portions at the corners of the geometric units 50, 70 and 80.

The shapes and configurations of the geometric units 50, 70 and 80 may be modified as desired or needed, including providing different axes of symmetry. For example, with respect to the first geometric units 50 and 50', the concave portions 58 may be directed in the X or Y directions.

Figure 6:
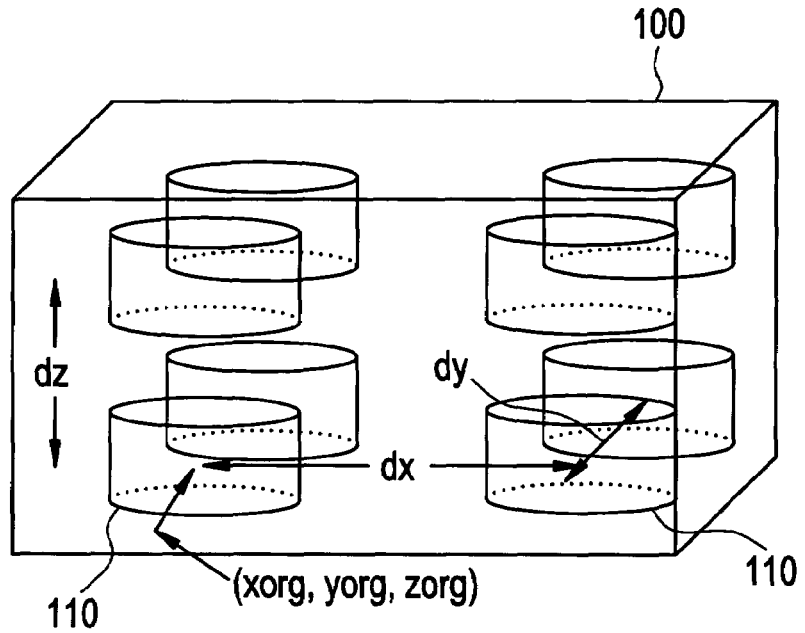
FIG. 6 is a block diagram illustrating a modeling method in accordance with an exemplary embodiment of the present invention.

Further, exemplary embodiments of the present invention may provide additional methods and functionality for use in connection with the modeling component 22. Exemplary embodiments of the present invention provide for embedding individual geometric units into other geometric units. As shown generally in FIG. 6, an embedding method provides for embedding one geometric unit, or an arbitrary three-dimensional array of a geometric unit, into another to form a complex unit. If an array is embedded, each geometric unit of the array is stored and tracked independently, for example, using the analytic system 20. For example, and as shown in FIG. 6, the following specifications may be provided to describe the regions shown therein:

(1) The parent region 100 (e.g., rectangular box) is a first unit and described by the following input:

| BOX TYPE | 1 | /* Parent Region | | | | | |
|---|---|---|---|---|---|---|---|
| CUBOID | 2 | 50.0 | −50.0 | 30.0 | −30.0 | 60.0 | 0.0 |

(2) The embedded regions 110 (e.g., cylinders) in the parent region 100 are the second units and described by the following input:

| BOX TYPE | 2 | /* Embedded Fuel Cylinder | | |
|---|---|---|---|---|
| CYLINDER | 1 | 10.0 | 10.0 | −10.0 |

Thus, the above geometry could be described as a complex embedded region by the following input example in which fuel cylinder region 2 is embedded in a 2×2×2 lattice into surrounding complex region 1:

| COMPLEX | 1 | 2 | −35.0 | −15.0 | 15.0 | 2 | 2 | 2 | 70.0 | 30.0 | 30.0 |
|---|---|---|---|---|---|---|---|---|---|---|---|

In the above relation, the associated input parameters may be as follows: the initial fuel cylinder 2 is embedded at x,y,z coordinate positions (−35.0, −15.0, −15.0), and the remaining 2×2×2 lattice of seven additional fuel cylinders are spaced using dx=70.0, dy=30.0 and dz=30.0, relative to the x,y,z starting coordinate positions.

Thus, more than one geometric unit may be embedded in a complex parent region 100. For example, the embedded geometric units may be different, and each may overlap boundaries of either the complex parent region or of other embedded regions.

Various exemplary embodiments of the present invention providing complex embedding that may be configured to provide the following:

- Other geometric units, or arrays of other geometric units, can be embedded between already embedded units;
- The embedded regions 110 can themselves also be complex regions i.e., with other geometric units embedded into them, and the level of the embedding can be unlimited (with the complex region at each level carrying all earlier complex levels);
- Complex regions can be placed in any of the array locations in a standard mixed box array geometry;
- Geometric units embedded into a parent region 100 do not have to include an outer cube or cuboid region;
- Embedded regions 110 can be rotated in the parent region 100;
- The first, second and third geometric units 50, 70, 80 can be embedded into the parent region 100;
- Overlap of embedded geometric units with the boundaries of the parent region 100, or the boundaries of other embedded geometric units, can be permitted or disallowed, based upon input options; and
- Specification of the location in the parent region 100 wherein the embedded region(s) 110 is to be positioned.

In an exemplary embodiment, the following parameters are provided for defining the complex embedded region formed by the parent region 100 and embedded region(s) 110:

(1) BOX TYPE of the parent region 100 into which, for example, geometric units are to be embedded, and which defines the geometric structure of the parent region 100;

(2) BOX TYPE of the embedded region 110, which defines the geometric structure of the embedded region 110 (e.g., cylinder);

(3) The location of the embedded region 110 in the parent region 100 (e.g., X-axis, Y-axis, and Z-axis translation of first embedded region 110 to the parent region 100)

(4) The size of the three dimensional array if the embedded region 110 is to be placed into an array in the parent region 100 (e.g., number of regions to embed in the X, Y, and Z directions (NXEMB), (NYEMB), (NZEMB);

(5) Center-to-center spacing of embedded regions 110 [e.g., X direction (DELX), Y direction (DELY), Z direction (DELZ)];

Thus, a complex embedded option (CEO) analytic method allows for embedding multiple geometric units into a region at one time (e.g., embed a regular array of units). Using the specified parameters, a first embedded region is positioned and the other embedded regions are positioned based on the number of units and their relative spacing as defined by the above parameters. This is performed by sequentially incrementing the position variables (x,y,z) with the spacing variables (DELX, DELY, DELZ). In particular, the NXEMB, NYEMB, and NZEMB values define the number of embedded regions 110 to be specified in the X, Y, and Z directions. The DELX, DELY, and DELZ values define the relative spacing between embedded regions 110. It should be noted that the resulting geometric model is identical to the one that would be created by specifying each unit separately, which would require separate inputs for each embedded region 110 to be embedded.

Further, exemplary embodiments of the present invention provide for virtually filling a region, and more particularly embedding a single individual geometric unit into other geometric units.

Figure 7:
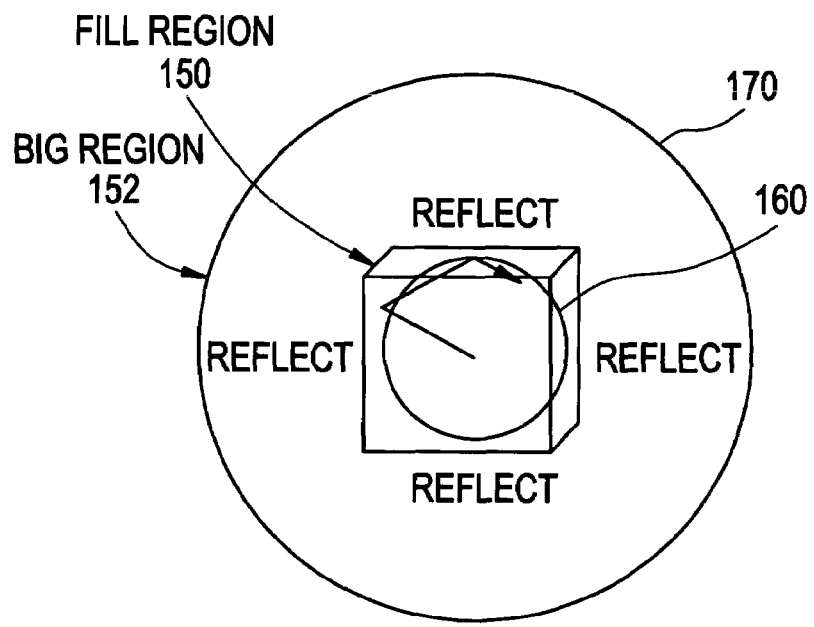
FIG. 7 is a block diagram illustrating another modeling method in accordance with an exemplary embodiment of the present invention.

FIG. 7 is a block diagram illustrating another modeling method in accordance with an exemplary embodiment of the present invention. FIG. 15C is a simplified flow diagram of the virtual fill option. A Virtual Fill Option (VFO) embeds a single geometric unit into a parent region. A simplified flow diagram of the Virtual Fill Option is shown in FIG. 15C. The embedded unit may be any of the standard geometry types as described herein, or one of the geometric units 50, 70, 80. For example, and as shown in FIG. 7, a virtual fill region 150 (e.g., three-dimensional box) includes an internal region 160 (e.g., sphere) embedded into a parent region 170. It should be noted that different geometric units may be embedded using the VFO.

For example, the following exemplary input parameters might represent an application of the virtual fill option model construct as shown in FIG. 7:

| BOX TYPE | 1 | /* The Embedded VFO Unit |
|---|---|---|
| SPHERE | 2 | 12.5 /* mixture 2, radius = 12.5 cm |
| CUBE | 4 | 20.0 −20.0 /* mixture 4, length 40 cm |
| BOX TYPE | 2 | /* The VFO Parent Region |

-continued

| SPHERE | −1 | 40.0 /* embed box type 1, length 40 cm |
|---|---|---|
| CUBOID |  8 | 50.0 −50.0 100.0 0.0 50.0 −50.0 /* mixture 4, |

Wherein, for example, Mix No. 2 may be $UO_2$, Mix No. 4 may be water, and Mix No. 8 may be low-density interspersed water. The −1 Mix No. for the SPHERE in BOX TYPE 2 refers back to BOX TYPE 1, which is the internal region 160 within the virtual fill region 150. It should be noted that BOX TYPE 2 may contain other geometry regions that are virtual fill regions 150 having BOX TYPE 1, or other units, as the embedded internal regions 160. In Monte Carlo neutron transport methods, the virtual fill option (VFO) analytic procedure begins with a neutron entering the Region 152 as shown in FIG. 7.

In operation, using the virtual fill option (VFO) analytic method, in connection with, for example, an analytic system 20, the location of the embedded unit (e.g., spherical internal region 160) is specified and the type of reflection provided at the boundary of the virtual fill region 150 is specified. In one exemplary embodiment, mirror reflection or periodic reflection may be selected. The virtual fill option allows for tracking in the parent region 170 based upon the geometry of the internal region 150 and upon the boundary reflection condition selected. When tracking a particle, a dual set of (x,y,z) location variables is created, one of which is the regular code set and the second of which is the VFO set applicable only to the virtual fill region 150. When the VFO location variables indicate that a boundary of the virtual fill region 150 is reached, the specified reflection condition is applied (e.g., inverting the tracking direction or replacing the location X, Y, Z set with the values on the opposite side of the virtual fill region 150) and VFO tracking is continued. When the standard tracking variables for the regular geometry box show that the VFO tracking has reached one of the boundaries of the parent region 170, VFO tracking is discontinued and all tracking is done by the regular tracking.

Specifically, and with respect to tracking in the virtual fill region 150, at the final external boundary, when the tracking is leaving the parent region 170, the final VFO location set (X, Y, and Z) is saved, and these values are used as the starting point the next time the parent region 170 is entered. For example, in Monte Carlo calculations with particle tracking based upon random numbers, this effectively moves the virtual fill region 150 within the parent region 170 each time the VFO region is entered, giving the entire calculation a geometry presentation that is the average of all possible arrays of the virtual fill region 150 in the parent region 170. The only boundary conditions for the virtual fill region 150 are mirror reflected or periodic reflected, and thus, the dimensions of the virtual fill region 150 determine the pitch between units in an array, and the only variable for the array is the location of the virtual fill region. Further, the initial locations (i.e. X,Y,Z sets) for starting of VFO tracking are specified.

In another exemplary embodiment, the tracking in the virtual fill region 150 provides that at the final external boundary, when the VFO tracking is leaving the parent region 170, the final VFO location set (X, Y, Z) is not saved, and the value used as the starting point the next time the parent region 170 entered is the actual point at which the parent region 170 is entered. Thus, the virtual fill region 150 is maintained in its initial position, and the VFO tracking calculates at what point in the virtual fill region 150 the entry point occurs. In such a case, the VFO presents the equivalent of an exact array in the parent region 170 and the results will not be averaged over all possible initial locations of the virtual fill region 150. Further, overlap of the virtual fill region 150 when the boundaries of the parent region 170 are reached, or whether to delete the virtual fill region 150 if there is any overlap may be provided.

Thus, using the geometric units 50, 70 and 80 and the methods described herein (i.e., complex embedded option (CEO) and virtual fill option (VFO)), a modeling component 22 of an analytic system 20 may more easily provide modeling of a system (e.g., a modeled fissile system). For example, an interaction analysis for a fuel manufacturing facility production area containing multiple fissile processes or equipment may be provided based upon modeling of the area using exemplary embodiments of the present invention. The production area may be a ninety foot by one-hundred twenty foot by fifteen foot high room in a manufacturing area, for example, that houses five pellet grinder lines and associated processing equipment. From a nuclear analysis perspective, the area is complicated, with numerous types and sizes of unit geometries and with fuel materials including, for example, pellets, fuel rods, grinder swarf and $UO_2$ powder. Using exemplary embodiments of the present invention, more exact modeling of the various geometries within the production area may be provided (e.g., modeling of the storage of pellets in three gallon containers and pellet boats having randomly dispersed pellets therein).

Figure 8:
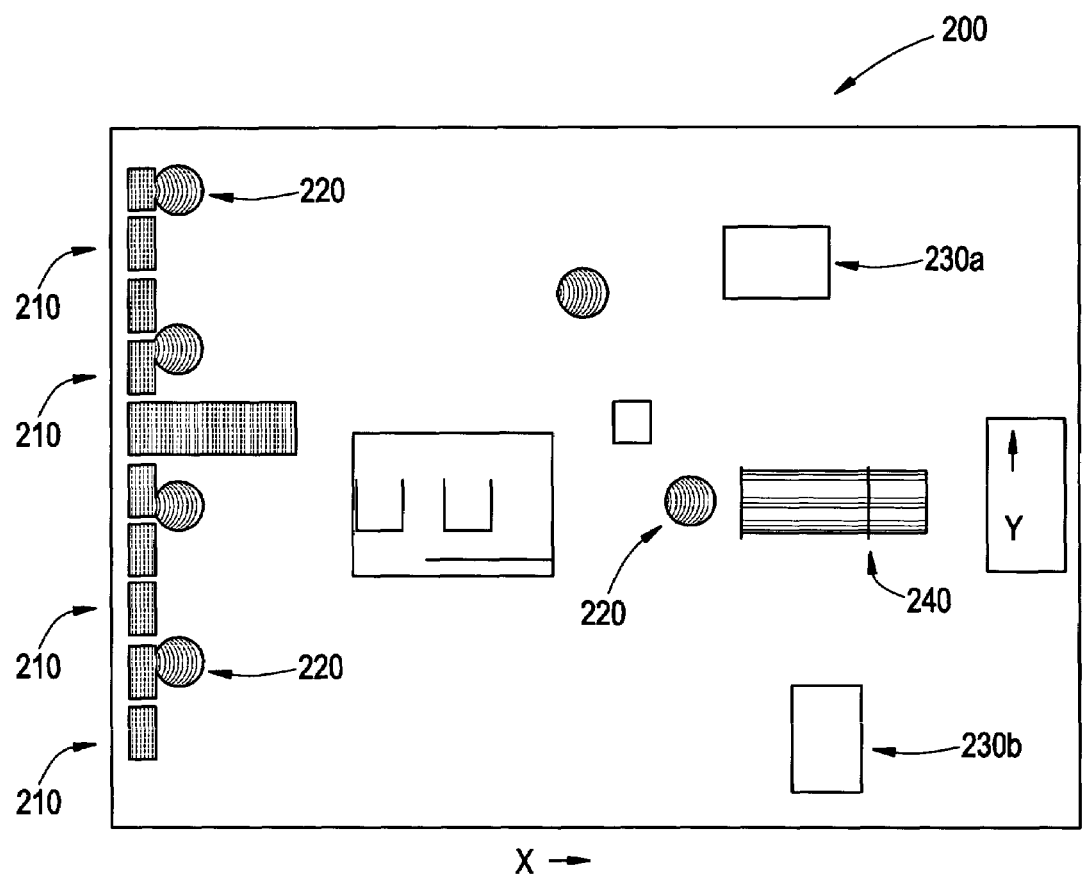
FIG. 8 is a schematic diagram showing a modeled area using a combination of geometric constructs and modeling methods in accordance with an exemplary embodiment of the present invention.

FIG. 8 is a schematic diagram showing a modeled area using a combination of geometric constructs and modeling methods in accordance with an exemplary embodiment of the present invention. FIG. 8 shows a portion of a production area 200 modeled using the geometric units and methods of exemplary embodiments of the present invention in connection with an analytic system 20. The modeled production area 200 is generated in one exemplary embodiment using complex embedding of the individual units (or arrays of the individual units) in a large three-dimensional region representing the entire production area.

In FIG. 8, the rectangular units 210 are modeled pellet boats into which a triangular lattice of pellets has been embedded using the first geometric units 50 and 50' and the virtual fill methods. Further, each of the rectangular units 210 are the same unit and have been embedded as arrays into the modeled production area 200 using complex embedding. For example, note the interference patterns shown in the pellet boats, which indicate that the contents are created using VFO methods (i.e., created using virtual fill).

The circular units 220 are modeled three gallon cans that include a triangular lattice of pellets embedded using the first geometric units 50 and 50' and the VFO methods. In certain cases the contents of the three gallon containers may be, for example, grinder swarf, and the fuel mixture could then be modeled using one of the VFO methods with one of the geometric units 50, 70 or 80. The availability of different geometry constructs permits modeling of similar equipment that my have entirely different contents. In this example, containers of fuel pellets must be treated differently from containers with grinder swarf, primarily because of the dimensions of the individual pellets and the particles constituting the grinder swarf. Fuel pellets have dimension greater than, for example, 0.30 inches, and modeling of lattices in a geometry such as a three gallon container may only required a few thousand individual pellets. This may be achievable with the complex embedded option. Grinder swarf, on the other hand, has dimensions much less than 0.01 inches so that modeling in a three gallon container may require millions of individual units. It should be noted that this can not be practically handled with the complex embedded option, but is readily handled with the virtual fill option (VFO) analytic method.

The two rectangular units 230a and 230b are modeled pellet carts, each of which may be the same. The rectangular unit 230b has been embedded using a ninety-degree rotation in its specification. The pellet carts modeled by the rectangular units 230a and 230b are nestings of embedded regions, for example: a first region representing a two foot long fuel rod (i.e., row of pellets modeled as a rod), is embedded as a two high triangular lattice array into a second region representing a pellet tray into which are also embedded side rails, a tray support and a tray base, all of which are embedded as a fifteen high array in a third region representing a pellet cart. Also, the rectangular unit 240 is a modeled layer of pellet trays modeled the same as the two rectangular units 230a and 230b.

Figure 9:
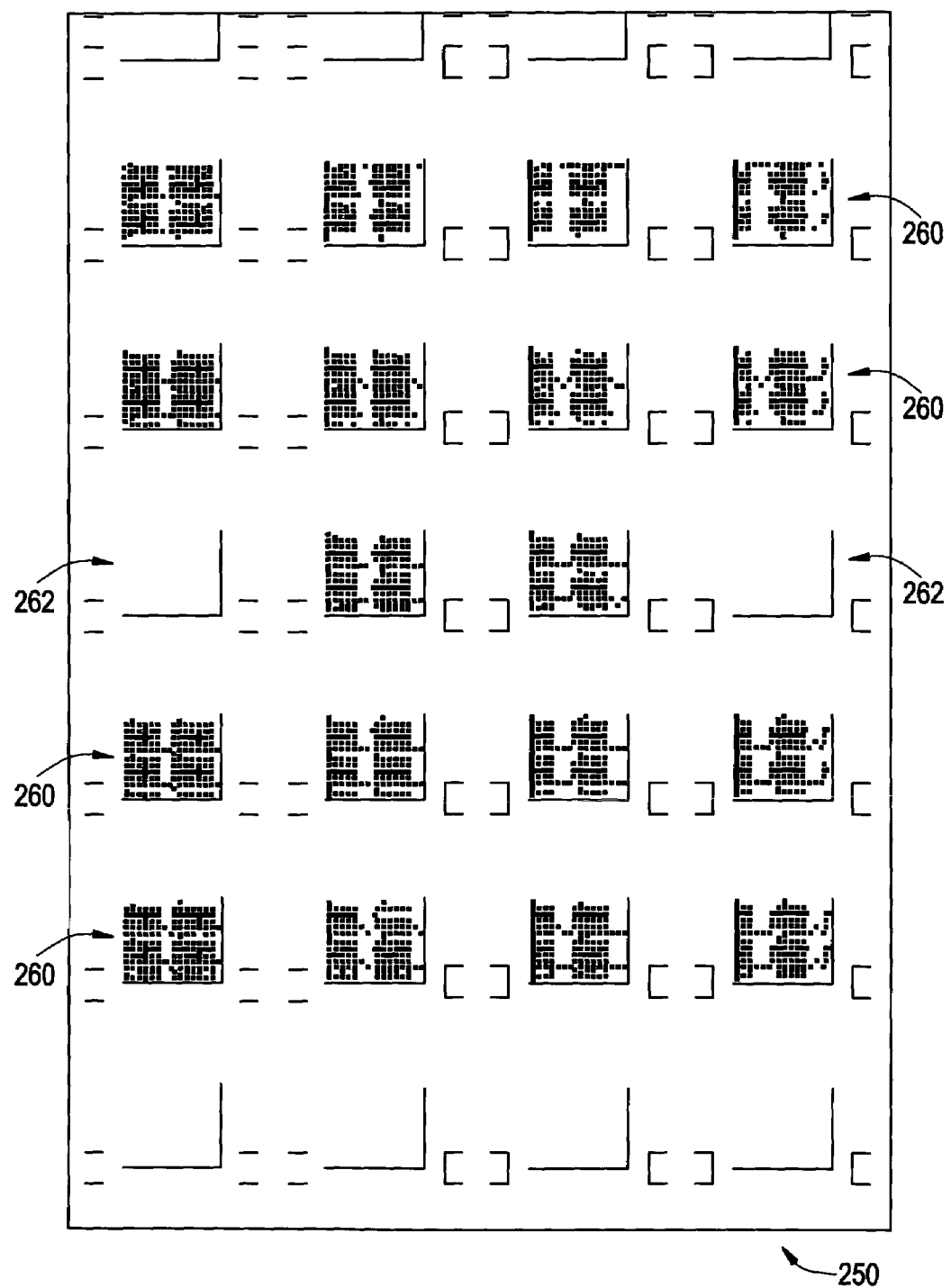
FIG. 9 is a schematic diagram illustrative of the modeled contents within a storage cabinet in the modeled area of FIG. 8.
Figure 10:
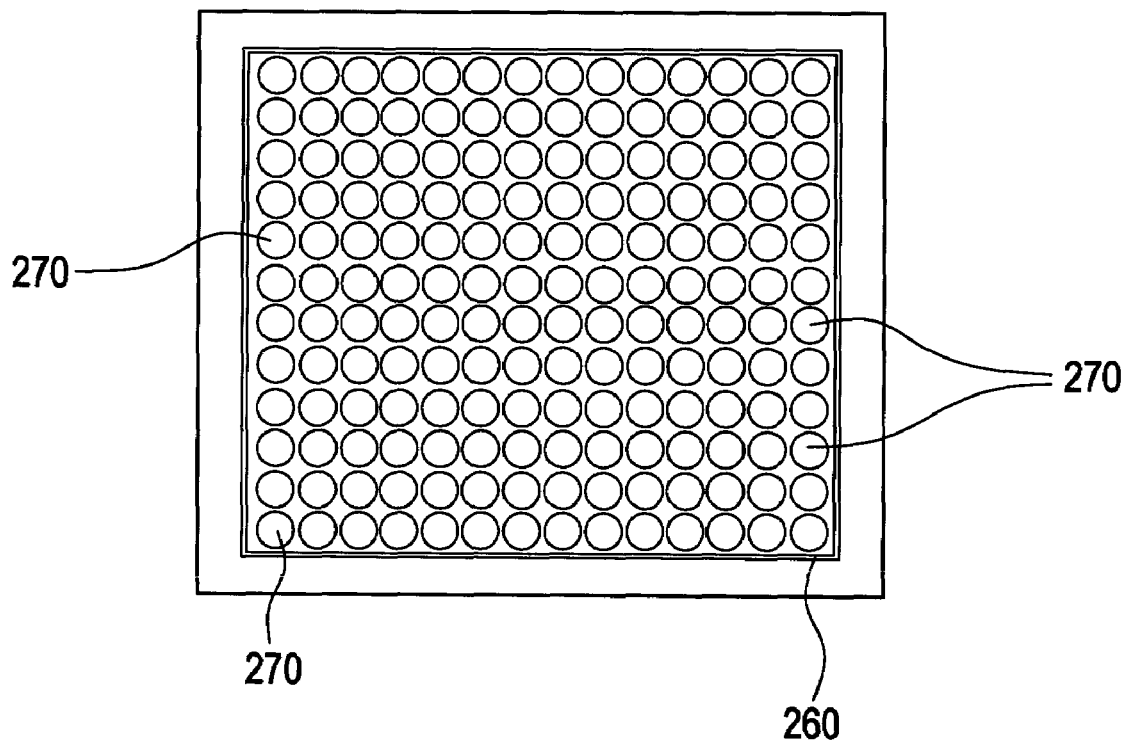
FIG. 10 is a schematic diagram illustrative of a close-up view of the modeled tray within the storage cabinet in the modeled area of FIG. 8.

FIG. 9 is a schematic diagram illustrative of the modeled contents within a storage cabinet in the modeled area of FIG. 8. FIG. 10 is a schematic diagram illustrative of a close-up view of the modeled tray within the storage cabinet in the modeled area of FIG. 8. Further, and for example, an array of rod storage cabinets within the production area may be modeled, which may be, for example, multilevel arrays, such as complex embedded arrays embedded into complex embedded arrays embedded into complex embedded arrays. FIG. 9 shows the modeled contents 250 (e.g., plurality of trays 260) within each of the storage cabinets and FIG. 10 shows an expanded view of a single rod tray 260 (e.g., stainless steel tray) in the cabinet. Referring specifically to FIG. 9, the contents 250 of a single cabinet may not be uniform, for example, as shown, ten of the tray locations 262 are empty, which is required because of criticality safety considerations. In operation, and using exemplary embodiments of the present invention, and specifically complex embedding, an entire array may be filled with a given embedded unit, and then one or more of the array locations overwritten with a new unit.

Referring now to FIG. 10, modeled rods 270 (e.g., fuel rods) in the rod tray 260 are a single clad fuel rod with cladding and air gap as specified in a predefined fuel design. This rod is embedded in the rod tray 260 using complex embedding of an array. If the geometry specifications do not exactly match the internal dimensions of the rod tray 260, the overlapping rods 270 are modeled only in the parts internal to the rod tray 260 boundary.

FIG. 5 is a schematic diagram illustrating the use of a geometric constructs using in an ordered array in accordance with an exemplary embodiment of the present invention. Also, the rods 270 in the rod tray 260 may be modeled as a triangular lattice, using multiple complex regions with a regular fuel rod box region or with a ±1 (missing edges) using the first geometric units 50 and 50' and as shown in FIG. 5.

Thus, a production area containing multiple fissile processes or equipment described herein can be represented in accurate detail by combining the various embodiments described herein (e.g., simple geometric constructs coupled with the CEO and VFO analytic options) to create a complex interaction model.

Further, and as another example of the operation of the various exemplary embodiments of the present invention for modeling a system, analysis of a fissile shipping container for heterogeneous contents (e.g., low enriched $UO_2$) may be provided based upon modeling using the various geometric units 50, 70 and 80 and methods described herein. It should be noted that the term heterogeneous contents means that the fissile material, for example enriched $UO_2$, may occur as clumps of higher density particles rather than being uniformly dispersed through a region (e.g., as in homogeneous powder).

For example, an exemplary shipping container for shipping large quantities of low enriched $UO_2$ may include nine internal stainless steel cylindrical canisters that are equally spaced in a three-by-three array in a large outer stainless steel box (e.g., nearly cubical box). Each of the canisters is allowed to contain a specified maximum amount of uranium oxide of unrestricted particle size (e.g., 46 kgs heterogeneous $UO_2$ per canister at specified maximum U-235 enrichment).

Nuclear criticality safety evaluation of shipping containers are required by regulations. In an exemplary analysis of the shipping container authorizing heterogeneous material contents, the contents in each of the canisters are modeled as water moderated lattices of full density $UO_2$ rods, with varying rod diameters, rod heights and rod spacing (pitch) to determine the most reactive configuration. Multiple cases are analyzed based upon the specified rod diameter and pitch and on a varying maximum $UO_2$ mass in the canisters. In each of the cases, the height of the rod lattice in the canister is determined by the specified rod diameter and pitch, the UO2 mass limit, with the type of boundary condition specified, for example, whether the rods in the lattices are permitted to overlap the canister boundary or whether individual rods overlapping the boundary are to be deleted in their entirety.

Figure 11A:
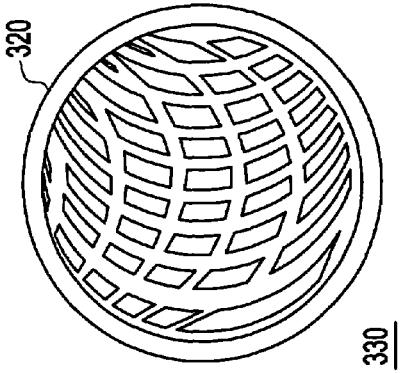
FIGS. 11A-11F are plots of shipping canisters modeled in accordance with the exemplary embodiments of the present invention.
Figure 11B:
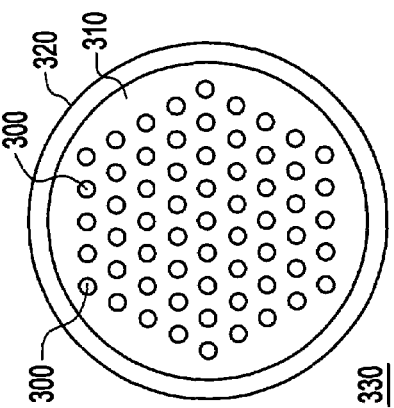
Figure 11C:
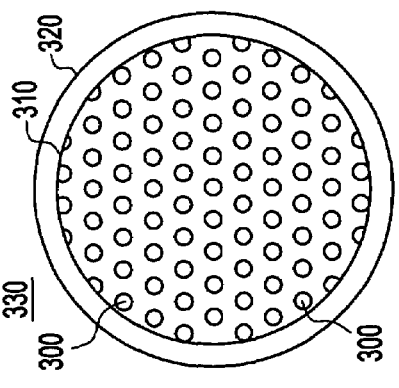
Figure 11D:
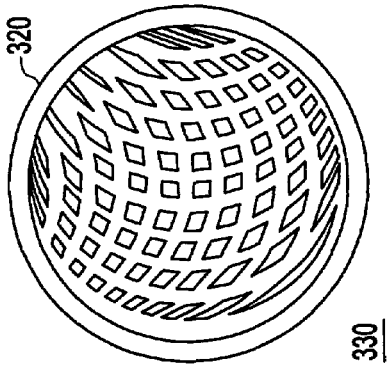
Figure 11E:
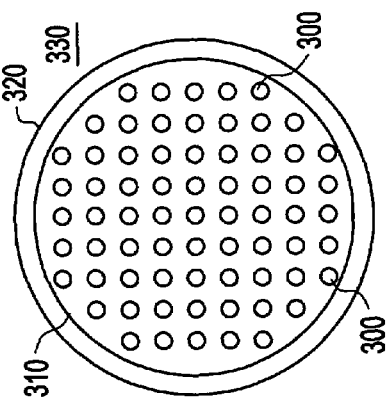

FIGS. 11A-11F illustrate X,Y plots of a single canister modeled using various embodiments of the present invention. As shown therein, a plurality of $UO_2$ fuel rods 300 are modeled surrounded by full density water 310 within a canister 320. The canister 320 is modeled within packaging material 330 embedded within the shipping container box. The complex embedded option (CEO) is used to provide the modeling. The canister is embedded as a single unit in a three-by-three lattice in the X-Y plane, with nine different single unit/lattices embedded in the Z vertical plane. Further, each of the geometries shown is modeled by embedding one or more lattices of individual fuel rods into the interior of the canister. For example, as shown in FIG. 10, a two dimensional array of a fuel rod box was embedded within a single complex unit (i.e., embedded square lattice). Referring to FIGS. 11D-11E, the triangular lattices shown therein may be modeled using the first geometric units 50 and 50' having alternation units with a +1 Missing edges and the other with a −1 axis.

Figure 11F:
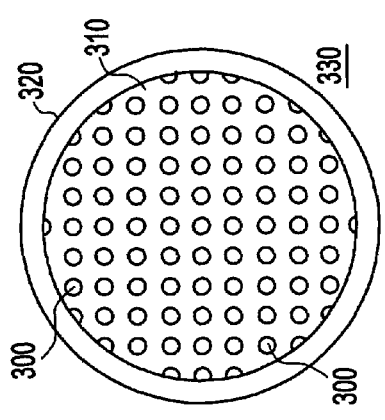

Further, FIGS. 11C and 11F show geometry plots of models using virtual filling as described herein to provide embedded square and triangular lattices, respectively, for the same rod and pitch geometries as shown in FIGS. 11A, 11B, 11D and 11E. Using virtual fill option (VFO), the modeled canister is created with only a single embedded box (i.e., single embedded unit). Specifically, the square lattice as shown in FIG. 11C is modeled as an embedded box with a simple fuel cylinder centered in a (X, Y) square, and the triangular lattice as shown in FIG. 11F is modeled as an embedded first geometric unit 50. It should be noted that the VFO plots of the internal fuel lattice region shown in FIGS. 11C and 11F do not show the location of fuel and moderator, but instead show an interference pattern (e.g., curved grid surfaces) as a result of the neutron tracking performed in the virtual fill region.

Thus, using the various exemplary embodiments of the present invention, models of smaller components, for example small fuel rods (e.g., 0.025 inches) within a canister may be provided using complex embedding and virtual fill, along with the geometric units as described herein. Further, a complex fissile shipping container containing heterogeneous (fissile) material payload described herein can be represented in accurate detail by combining the various embodiments described herein (e.g., simple geometric constructs coupled with the CEO and VFO analytic options) to create a complex shipping container model.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A computer simulator implemented method of modeling a fissile system in a neutronics modeling method comprising:
   inputting, into the computer simulator, neutronics characteristics of at least one first geometric construct;
   inputting, into the computer simulator, an indication that the at least one first geometric construct completely fills a second geometric construct;
   performing, by the computer simulator, a criticality analysis of the fissile system including the first and second geometric constructs, the performing including defining at least one neutronic characteristic of the second geometric construct as if the second geometric construct were completely filled with a plurality of the first geometric constructs without inputting the at least one neutronic characteristic of the second geometric construct; and
   outputting the criticality analysis of the fissile system including the first and the second geometric constructs.

2. The method of claim 1, wherein the second geometric construct is a region to be modeled in a neutronics modeling method.

3. The method of claim 1, wherein the first geometric construct includes a generally rectangular body having curved surfaces on the generally rectangular body.

4. The method of claim 3, wherein the curved surfaces are shaped as a portion of a surface of a cylinder or a sphere.

5. The method of claim 3, wherein the curved surfaces are shaped according to quadratic surface equations.

6. A method of claim 1, wherein the first geometric construct is formed by forming at least one interstitial region, the first geometric construct being formed by boundaries of the at least one interstitial region.

7. The method according to claim 6, wherein the boundaries of the at least one interstitial region are shaped such that the formed first geometric construct is cylindrical or spherical.

8. The method according to claim 7, wherein the boundaries of the at least one interstitial region are shaped such that the formed first geometric construct is shaped according to quadratic surface equations.

9. The method according to claim 1 further comprising:
   obtaining an effective neutron multiplication factor of a modeled system containing each geometric construct, wherein each geometric construct represents an object in a fissile system and has associated neutronic characteristics of the represented objects.

10. A computer simulator implemented method of modeling a fissile system in a neutronics modeling method comprising:
    inputting, into the computer simulator, neutronics characteristics of at least one first geometric construct;
    inputting, into the computer simulator, placement data of the at least one first geometric construct in a second geometric construct;
    performing, by the computer simulator, a criticality analysis of the fissile system including the first and second geometric constructs, the performing including defining at least one neutronic characteristic of the second geometric construct as if the second geometric construct contains the at least one first geometric construct based on the placement and neutronic characteristics of the at least one first geometric construct; and
    outputting the criticality analysis of the fissile system including the first and the second geometric constructs.

11. The method of claim 10, further comprising:
    placing at least one of the second geometric construct into a third geometric construct; and
    defining at least one neutronic characteristic of the third geometric construct as if the third geometric construct contains the at least one second geometric construct based on the placement and neutronic characteristics of the at least one second geometric construct.

12. The method of claim 11, wherein the steps of claim 11 are repeated N times with Nth geometric constructs so as to form a plurality of levels of embedded geometric constructs and wherein at least one neutronic characteristic of the Nth geometric construct is based on the placement and neutronic characteristics of each preceding level of geometric constructs and wherein N is a positive integer.

13. The method of claim 10, wherein a plurality of the first geometric constructs are placed into the second geometric construct and wherein each first geometric construct of the plurality of the first geometric constructs do not possess identical neutronic characteristics.

14. The method of claim 10, wherein a plurality of the first geometric constructs are placed into the second geometric construct and at least two first geometric constructs of the plurality of first geometric constructs spatially overlap and form an overlapping region within the second geometric construct.

15. The method of claim 10 further comprising:
    rotating the first geometric construct within the second geometric construct; and
    defining at least one neutronic characteristic of the second geometric construct based on the placement and the rotation of the first geometric construct.

16. The method according to claim 11 further comprising:
    obtaining an effective neutron multiplication factor of a modeled system containing each geometric construct, wherein each geometric construct represents objects in a fissile system and have associated neutronic characteristics of the represented objects.

17. A computer simulator implemented method of modeling a fissile system in a neutronics modeling method comprising:
    inputting, into the computer simulator, neutronics characteristics of a first geometric construct;
    inputting, into the computer simulator, an indication that the at least one first geometric construct completely fills a second geometric construct;
    inputting, into the computer simulator, placement data of at least one second geometric construct in a third geometric construct;
    performing, by the computer simulator, a criticality analysis of the fissile system including the first, second, and third geometric constructs, the performing including
        defining at least one neutronic characteristic of the second geometric construct as if the second geometric construct were completely filled with a plurality of the first geometric constructs without inputting the at least one neutronic characteristic of the second geometric construct, and defining at least one neutronic characteristic of the third geometric construct based on the placement and neutronic characteristics of the at least one second geometric construct; and outputting the criticality analysis of the fissile system including the first, second, and third geometric constructs.

18. The method of claim 17, wherein a plurality of the second geometric constructs are placed into the third geometric construct and at least two second geometric constructs of the plurality of second geometric constructs spatially overlap and form an overlapping region within the third geometric construct.

19. The method of claim 18, wherein the at least two second geometric constructs do not possess identical neutronic characteristics.

20. The method of claim 19, wherein at least one neutronic characteristic of the overlapping region is defined exclusively by a corresponding neutronic characteristic of one second geometric construct of the at least two second geometric constructs forming the overlapping region.

21. The method of claim 20, wherein the one second geometric construct of the at least two second geometric constructs forming the overlapping region is chosen based on inherent priority of the one second geometric construct or user input.

* * * * *